United States Patent [19]
Morningstar et al.

[11] 4,085,267
[45] Apr. 18, 1978

[54] PROCESS FOR THE SUSPENSION POLYMERIZATION OF VINYL CHLORIDE WITH LOW POLYMER BUILDUP

[75] Inventors: Marion George Morningstar; Robert Lewis Bowles, both of Avon Lake, Ohio

[73] Assignee: The B. F. Goodrich Company, Akron, Ohio

[21] Appl. No.: 660,063

[22] Filed: Feb. 23, 1976

[51] Int. Cl.² ............ C08F 2/20; C08F 2/00; C08F 14/06
[52] U.S. Cl. .................... 526/74; 526/196; 526/200; 526/204; 526/236; 526/344
[58] Field of Search ............ 526/74, 196, 198, 204, 526/200

[56] References Cited
U.S. PATENT DOCUMENTS

| | | | |
|---|---|---|---|
| 3,669,946 | 6/1972 | Koyanagi | 526/74 |
| 3,817,959 | 6/1974 | Balwe′ | 526/74 |
| 3,900,455 | 8/1975 | Kraft | 526/195 |
| 3,926,910 | 12/1975 | Mowdood | 260/45.95 C |

FOREIGN PATENT DOCUMENTS

| | | | |
|---|---|---|---|
| 354,581 | 7/1961 | Switzerland | 526/344 X |

*Primary Examiner*—Christopher A. Henderson, Jr.
*Attorney, Agent, or Firm*—Roy P. Wymbs

[57] ABSTRACT

The invention relates to reduction of polymer buildup during the suspension polymerization of vinyl chloride, either alone or with other olefinically unsaturated monomers copolymerizable therewith. There is employed a particular combination of ingredients in the polymerization recipe, the essential features being the use of a water phase inhibitor and an oil phase inhibitor along with a substantially water-insoluble polymerization initiator and operating at a high pH. A multiplicity of charges may be polymerized in the reactor without opening the same.

16 Claims, No Drawings

PROCESS FOR THE SUSPENSION POLYMERIZATION OF VINYL CHLORIDE WITH LOW POLYMER BUILDUP

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or "buildup", of solid polymer on reactor surfaces, not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems are inherently unstable and during the polymerization reaction, vinyl chloride polymer builds up on the interior surfaces of the polymerization reactor, including the surfaces of the baffles and agitator. Obviously, this polymer buildup must be removed since it results in further formation of polymer buildup on the reactor surfaces which results in a crust that adversely affects heat transfer and contaminates the polymer being produced.

The nature of the insoluble polymer buildup on the walls of the reactor is such that in the commercial production of polymers, as described above, it was the practice in the past to have an operator enter the reactor, after each polymerization reaction was completed, and hand scrape the polymer buildup off the walls and off the baffles and agitator. This procedure was not only costly, both in labor and down-time of the reactor, but most importantly, it has since been proven that this procedure has potential health hazards. Various methods have since been proposed to reduce the amount and nature of polymer buildup on polymerization reactor surfaces, such as solvent cleaning, various hydraulic and mechanical reactor cleaners, and the like, which have proved satisfactory to a certain extent but did not reach the ultimate in prevention of polymer buildup.

Subsequently, various methods of applying coating compositions to the inner surfaces of polymerization reactors have been developed which have represented a great step forward in the art. However, such coating methods require the installation of auxiliary equipment, more complex charging procedures and the danger of contamination of the polymer by coating ingredients. Accordingly, it would be most advantageous to have a polymerization recipe which would substantially eliminate polymer buildup and be readily adaptable to existing installations without addition of further equipment or alteration of existing equipment.

SUMMARY OF THE INVENTION

It has been found that with the proper combination of ingredients in a polymerization recipe for making polyvinyl chloride (PVC) or copolymers of vinyl chloride, products can be produced with substantially no polymer buildup on the inner surfaces of the reactor. We have unexpectedly found that when the vinyl chloride polymerization is conducted at a high pH, that is 7.0 or greater, and the polymerization recipe contains a water phase inhibitor, such as $NaBH_4$, an oil phase inhibitor, such as nigrosine, and a substantially water-insoluble polymerization initiator, such as, di(4-t-butyl cyclohexyl)peroxydicarbonate, polymer buildup is substantially eliminated and multiple charges can be run without opening the reactor between charges, thus substantially reducing the release of unreacted vinyl chloride to the atmosphere, which release cannot be tolerated in view of present governmental regulations.

DETAILED DESCRIPTION

The present invention is particularly adapted for use in those polymerization reactions which are conducted in an aqueous medium, such as suspension or dispersion polymerization. The invention is particularly adapted for use in the aqueous suspension polymerization of vinyl chloride, either alone or with other vinylidene monomers having at least one terminal $CH_2=CH<$ grouping. While the present invention is specifically illustrated hereinafter in connection with the suspension polymerization of vinyl chloride to produce PVC, it is to be understood that this is merely for purposes of simplicity and that the present invention may likewise be employed in making copolymers of vinyl chloride using the suspension or dispersion polymerization process in an aqueous medium. Various polymerizable ethylenically unsaturated monomers copolymerizable with vinyl chloride may be employed in making said copolymers. Examples of such monomers are vinylidene chloride, vinylidene fluoride, etc.; vinylidene monomers having at least one terminal $CH_2=CH<$ grouping, such as esters of acrylic acid, for example, methyl acrylate, ethyl acrylate, butyl acrylate, octyl acrylate, cyanoethyl acrylate, and the like; esters of methacrylic acid, such as methyl methacrylate, ethyl methacrylate, butyl methacrylate, and the like; styrene and styrene derivatives including α-methyl styrene, vinyl toluene, chlorostyrene, and the like; acrylonitrile, ethyl vinyl benzene, vinyl acetate, vinyl napthalene, etc.; diolefins, including butadiene, isoprene, chloroprene, and the like, and other vinylidene monomers of the types known to those skilled in the art.

As pointed out above, the present invention is particularly applicable to the suspension polymerization of vinyl chloride, either alone or in admixture with one or more other vinylidene monomers copolymerizable therewith in amounts as great as about 80% or more by weight, based on the total weight of the monomer or monomer mixture.

In the practice of the present invention, an aqueous suspension polymerization system is employed. In suspension polymerizations, the reaction is preferably conducted in pressure reaction vessels or polymerizers which have an inner wall of stainless steel or are glass-lined. The vessel is equipped with suitable mechanical agitation means and baffles in order to produce and maintain the desired suspension or dispersion of the monomer charge and of the resulting vinyl chloride homopolymer or vinyl chloride copolymer. In addition, the reaction vessel should be equipped with suitable heat removal means or be jacketed so that the temperature in the reaction vessel can be controlled during the polymerization reaction.

In the suspension polymerization reaction, the polymerization chamber is first purged with nitrogen, or evacuated, in order to remove all traces of air. Thereafter, the materials to be used in the reaction are charged to the polymerization chamber. Usually in suspension polymerization systems the order in which the materials are charged to the polymerization chamber is of no significant importance. However, in the present invention, the order of charging is important and the best results are obtained when the materials to be used in the reaction are charged to the polymerization chamber in the following manner: first, the reaction medium, or demineralized water is added to the chamber and then the dispersant is added to the water with agitation or stirring. If desired, and for convenience, the water and dispersant may be admixed before charging to the reaction chamber. Next, the most important ingredients are added to the reaction mixture, namely, the water-soluble inhibitor and the oil-soluble inhibitor, or monomer soluble inhibitor. In many instances, where early catalyst or initiator addition is desirable, the same is added at this point. However, if so added, the temperature of the polymerization mixture must be kept below the temperature of activity of the initiator. It is preferred, however, in the present invention, to add the catalyst or initiator as the last ingredient. Next the monomer or monomers to be polymerized are charged to the chamber with continued agitation. If the catalyst has already been added, the reaction mixture is heated, with agitation, to the reaction temperature and maintained until polymerization is complete, or to the degree required or desired. When late catalyst addition is employed, the reaction mixture in the chamber, including the monomer or monomers, is first heated to the reaction temperature to be employed, with agitation, and the catalyst injected.

While demineralized water is preferred as the aqueous reaction medium, other liquid reaction media may be employed which are generically called aqueous reaction media which comprise, in addition to water alone, intimate admixtures of water with one or more organic solvents such as the alcohols including methyl, ethyl, propyl, butyl, amyl, hexyl, heptyl, octyl, methyl hexyl, dimethyl hexyl, and other alcohols, including the polyhydric alcohols, such as glycol, glycerol and the like; an alkyl nitrile, such as acetonitrile, ethylene cyanohydrin, and the like; the ethers, such as methyl, ethyl, propyl, butyl and higher ethers, and the like; the ketones, such as acetone, methyl ethyl ketone, cyclohexanone, and the like.

In the suspension polymerization reaction system the reactor is not completely full and the completion of the reaction is determined by a predetermined pressure drop. The reaction will usually be complete and thus terminated when there is a drop in reaction pressure of from about 5 to 50 psi where the temperature of reaction is being maintained at a substantially constant level. If it is desired to stop the reaction quickly, a shortstopping agent can be injected into the reaction medium. While good results are obtained using a suspension polymerization reaction system wherein the reactor is not completely full, we have found that it is preferable to conduct the reaction in a polymerizer or reaction vessel which is substantially full, or as completely full as possible, throughout the duration of the reaction since superior results are obtained thereby. This system, which is embodied in the present invention as a preferred method of operation, of polymerizing with a full or filled reactor, is referred to hereinafter as the "hydrofull" process, for want of a better term and for simplicity. Operating with a less than full reactor is referred to as the "non-hydrofull" process.

When using the hydrofull process in the instant invention, the materials are charged to the polymerization reactor or chamber in the same manner as when operating non-hydrofull, as outlined above. Once polymerization of the monomer or monomers commences, the volume in the reactor will begin to shrink. This shrinkage can easily be detected and followed, for example, by means of a calibrated sight glass gauge or, more sophisticatedly, by means, for example, of a radio-active cobalt level detector mounted externally near the top of the reactor. Any other means of level detection known in the art may be employed. It is then necessary to maintain the reactor in a fully-filled condition by adding more aqueous polymerization medium thereto continuously during the reaction to replace the volume lost by shrinkage in the monomer phase. This is easily accomplished by pumping the aqueous medium into the reactor or by employing a charge tank containing the aqueous medium in communication with the reaction chamber which tank is under a pressure slightly in excess of the reactor pressure.

The predetermined or desired degree of conversion of the monomer or monomers in the hydrofull procedure is indicated by the total amount of aqueous polymerization medium added to the reaction during the course thereof. When said degree of conversion is reached, further addition of aqueous medium is stopped and, preferably, a polymerization short-stopping agent is added to the reactor in order to prevent further polymerization during blow-down, monomer recovery and polymer work-up, thereby preserving the polymer or copolymer in the desired condition. We have found that usually for each pound of polymer formed from 0.35 to 0.50 pound of aqueous medium will have to be added to the reactor in order to operate hydrofull. This is so when the polymerization reaction is conducted at a temperature in the range of about 30° C. to about 70° C. Of course, the amount of added aqueous medium will depend upon such factors as temperature of reaction, pressure, and the like.

After completion of the polymerization reaction, whether hydrofull or non-hydrofull, the charge or polymer slurry is then stripped of its unreacted monomer content by discharging the entire slurry or mixture from the reactor into a large hold-up tank wherein it is subjected to vacuum stripping and/or heating to drive off the unreacted monomeric materials. Once stripped of the residual monomers the solid polymeric reaction products are worked up in the conventional manner by filtration, washing and drying.

In the operation of the present process, whether or not it be hydrofull or non-hydrofull, the best results, with respect to substantial elimination of polymer buildup are obtained when the polymerization reaction is conducted in an alkaline aqueous medium. The beneficial results and advantages of the instant invention can be obtained when the pH of the reaction mixture is in the range of 7 to about 11. Preferably, the best results are attained when the pH is in the range of 8.0 to 10.0. It has been found that paper buildup is reduced when operating at a high pH. This is because peroxides are destroyed in the water phase at high pH. The means by which the basic pH of the aqueous polymerization medium is established and maintained are not especially critical. It is important that the reaction medium be maintained under neutral or basic conditions. These conditions may be established, for example, by the addition to the aqueous medium of an alkali metal hydroxide, such as sodium hydroxide, potassium hydroxide, and the like, and also ammonium hydroxide. Other alkaline compounds known to those skilled in the art may likewise be used, provided such compounds do not interfere in any way with the polymerization reaction. The basic or neutral pH of the aqueous polymerization medium may be maintained throughout the polymerization reaction by use of known types of buffer systems, for example, buffer salts, such as the alkali metal salts of weak acids, for example, sodium bicarbonate, sodium carbonate, calcium carbonate, alkali metal phosphates, such as secondary potassium phosphate, and the like, etc. It should be pointed out that since the borohydrides in the instant invention are strongly alkaline materials, such as sodium borohydride, the use of buffer systems may not be necessary to maintain the proper pH, since the sodium borohydride also acts as a buffering agent in addition to being a water-soluble inhibitor.

In the process of the present invention a dispersing agent or dispersant is added to the aqueous polymerization medium in order to obtain a more complete and uniform dispersal of the vinylidene monomer or monomers and catalyst or initiator throughout the reaction medium prior to and during the polymerization of the vinylidene monomoer or monomers. Any of the well known dispersants operative in aqueous media may be employed. These dispersants include, among others, methyl cellulose, hydroxyethyl cellulose, methylhydroxyethyl cellulose, hydroxypropyl cellulose, methylhydroxypropyl cellulose, carboxyl-methyl cellulose, polyvinyl alcohol, gelatin, polyvinylpyrrolidone, dodecylamine hydrochloride, sodium lauryl sulfonate, lauryl alcohol, sorbitan monolaurate, sorbitan palmitate, sorbitan monostearate, sorbitan monooleate, polyoxyethylene sorbitan monolaurate, polyoxyethylene sorbitan monopalmitate, polyoxyethylene sorbitan monostearate, nonylphenoxy polyoxyethylene ethanol, hydrolyzed polyvinyl acetate, and the like. One or more of these dispersants may be employed in combination, if desired. The amount of dispersant(s) employed will usually be in the range of about 0.005% to about 0.50% by weight based on the weight of the reaction mixture. Preferably an amount in the range of 0.01% to 0.10% by weight is employed to attain the desired results. Increasing the dispersant concentration decreases paper buildup.

In the present process an oil-soluble, free radical forming catalyst or initiator is employed in the reaction mixture. The catalyst should be substantially water-insoluble since as the water-insolubility of the catalyst increases, the polymer buildup decreases. The catalysts used are the dialkylperoxydicarbonates whose alkyl groups are straight chained or branched and contain from 4 to 14 carbon atoms. As examples of such catalysts there may be named di-secbutyl peroxydicarbonate, di(2-ethylhexyl)peroxydicarbonate, di(4-t-butylcyclohexyl)peroxydicarbonate, and the like. The amount of the catalyst used is normally kept as low as possible consistent with a good polymerization rate. The catalyst chosen may also be used in combination with one or more other catalysts from the same generic group, as above defined. The amount of catalyst employed will depend upon the particular catalyst or catalysts chosen and the temperature of the polymerization reaction. A catalyst concentration in the reaction mixture of about 0.001% to about 1.0% by weight based upon the weight of the monomer or monomers is satisfactory in the process of the invention. However, in order to achieve the optimum results, a catalyst concentration in the range of 0.01% to 0.10% by weight is used. As previously pointed out the catalyst may be added to the aqueous medium early, i.e. prior to addition of monomer or monomers, or it may be added late, i.e., as a last ingredient. It is preferred to add the catalyst as a last ingredient.

In the practice of the instant suspension polymerization process, the polymerization reactor is jacketed so that cooling or heating media can be passed therethrough in order to maintain the temperature of the polymerizer ingredients at the appropriate and predetermined level, both prior to and during the polymerization reaction. Usually the temperature of the polymerization reaction will be in the range of about 0° C. to about 80° C. To a great extent, the particular temperature employed will depend upon the particular vinylidene monomer or monomers being polymerized. However, it is preferred to conduct the polymerization reaction at a temperature in the range of 30° C. to 70° C.

The pressures employed during the suspension polymerization reaction will vary depending upon the monomer or monomers being polymerized and the temperature of reaction desired. The pressure should be great enough to keep the monomer or monomers in liquid form during the reaction. Usually, for the purposes of the present invention, pressures between 1 and 15 atmospheres are sufficient. In the vast majority of the cases, the polymerization reaction is carried out at the autogeneous pressure of the monomer or monomers.

The most important aspect of the instant inventive process is in the use of an oil-soluble polymerization inhibitor and a water-soluble polymerization inhibitor. This combination has not, to the best of our knowledge, been used in the art heretofore. The most useful of the water-soluble inhibitors has been found to be the borohydrides, particularly sodium borohydride, and the water-soluble salts of nitrous acid, particularly sodium nitrite. While sodium borohydride is a preferred inhibitor, the water-soluble inhibitors useful in the process of this invention are those borohydrides having the following general formula:

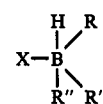

wherein X is an alkali metal and wherein each of R, R' and R" may be hydrogen, phenyl, an alkyl group containing from 1 to 10 carbon atoms or an alkoxy radical containing from 1 to 10 carbon atoms. Suitable water-soluble inhibitors having said formula are, for example, sodium borohydride, potassium borohydride, lithium borohydride, sodium timethoxyborohydride, lithium trimethoxyborohydride, sodium diethoxyborohydride, sodium tributoxyborohydride, potassium tripentoxyborohydride, sodium trimethylborohydride, sodium triethylborohydride, potassium trimethylborohydride, sodium triphenylborohydride, potassium triphenylborohydride, and the like.

The amount of borohydride normally employed as a water-soluble inhibitor in the instant suspension polymerization process is from about 0.0001 weight part to about 0.01 weight parts per 100 weight parts of monomer or monomers. Preferably an amount in the range of 0.0005 weight part to 0.005 weight parts are employed. Care must be taken in handling the borohydrides. For example, dilute aqueous solutions of sodium borohydride are unstable and cannot be made up in advance of the time for addition to the reaction medium. Granular sodium borohydride is hygroscopic and cakes in the container thus making it difficult to handle. However, caustic solutions of sodium borohydride are stable and the addition of the inhibitor can be handled in this way. For example, a 12% solution of sodium borohydride in 40% caustic is stable and has a more than adequate shelflife.

In addition to sodium nitrite, any other water-soluble nitrite may also be used such as, for example, alkali metal nitrites and alkaline earth nitrites, as well as ammonium nitrite, such as potassium nitrite, calcium nitrite, and the like. The nitrites are used in the polymerization reaction mixture in an amount in the range of about 0.0005 weight part to about 0.02 weight part per 100 weight parts of monomer or monomers. Preferably, the nitrite is employed in the range of 0.001 weight part to 0.004 weight part.

The oil-soluble inhibitor for use in the invention along with the water-soluble inhibitor is nigrosine which is a class of blue or black dyes. Those for use herein are the oil-soluble and spirit-soluble nigrosines. The nigrosine is employed in an amount in the range of about 0.0001 weight part to about 0.005 weight part per 100 weight parts of monomer or monomers. Preferably, an amount of nigrosine in the range of 0.0002 weight part to 0.002 weight part is used with the most satisfactory results.

In the specific examples, which follow hereinafter, the polymer buildup was determined by inspection. The buildup with which we are concerned is of two types, namely, "paper buildup" which is a thin gray continuous film directly on the reactor surface that has no discernible structure, and "sandy/chunky" buildup, which is a white grainy crust that is made up of an accretion of resin or polymer particles. In operation, the paper buildup, if any, is the first to form and often, the sandy/chunky buildup will occur on top of the paper buildup. Both types of buildup can be removed by means of a high pressure liquid jet stream. However, the sandy/chunky buildup is more easily removed. Paper buildup is the one to be avoided as much as possible. That is not to say that sandy/chunky buildup can be ignored since it is an offender and can flake off causing an inferior batch of polymer. The ideal is to be able to operate multiple charges in a single reactor over a long period of time with zero buildup or substantially zero buildup, which is possible with the present invention.

In order to assist in the evaluation of the type and amount of buildup that might occur, a standard numerical rating scale was devised. This rating scale is given in the following Table:

TABLE I

Buildup Rating Scale

A. Paper Buildup Scale

0 - Perfectly clean and shiny in areas where there is no sandy/chunky buildup. No paper at all.

0.5 - Faint haze all over or medium paper in a few scattered spots or streaks.

1.0 - Medium paper over not more than ½ of area or light paper all over.

2.0 - Medium paper over all surfaces or heavy paper over ½.

3.0 - Heavy paper over all surfaces.

B. Sandy/Chunky Buildup Scale (Includes Chunky, sandy, stucco, scaly or impingement particles)

0 - None at all.

0.5 - Few scattered spots or streaks.

1.0 - Light sand over ½ surface.

2.0 - Heavy sand over ½ of surface, or chunks on blade, shaft, baffle, etc., or heavy scale in streaks or bands.

3.0 - Sand and chunky over most surfaces. Buildup fairly heavy.

Having established the numerical rating scale, a numer of polymerizations or examples were run and the results tabulated. Such results are given in Table II below. These polymerizations were run in a 3 liter stainless steel pressure vessel equipped with a cooling and heating jacket, two Pfaudler agitators and one baffle. The basic polymerization recipe employed was as follows:

Demineralized water — 1930.0 grams
Hydroxypropyl methyl cellulose — 0.68 gram
Vinyl chloride — 1112.0 grams
plus the following ingredients in the amounts given, when used:
Di-sec-butyl peroxydicarbonate — 0.45 gram
Di(4-t-butyl cyclohexyl)peroxydicarbonate — 0.67 gram
Di(2-ethylhexyl)peroxydicarbonate — 0.67 gram
Sodium borohydride — 0.045 gram
Nigrosine — 0.0056 gram
Sodium nitrite — 0.045 gram In the case of each polymerization, the water and hydroxypropyl methyl cellulose were first added to the polymerization reactor. Then with agitation the nigrosine and sodium borohydride, or sodium nitrite, when used, were added. When the catalyst addition was early, it was likewise added at this time. After the ingredients were thoroughly mixed, the reactor was closed and evacuated. Next, the vinyl chloride monomer was added and heating and agitation begun. When the polymerization mixture was at a temperature of 56° C, the catalyst was injected, when late catalyst addition was called for. The pH of the reaction mixture was about 8.5. When the reaction was run hydrofull (hydraulically full), water was injected into the reactor to keep it completely full at all times. When 400 ml. of water was injected, the reaction was stopped. This indicated a conversion of 75%. The reactor was then opened, after removal of the contents thereof, and inspected to determine the amount of buildup. When the reaction was run non-hydrofull, no water was injected and the polymerization was stopped when the pressure decreased by 10 psi. After said inspection, the results were recorded and the same are set out in the following Table:

TABLE II

| Example | HF | Pts./ 100 Pts. Monomer MOC | Catalyst | Addition | Parts Per 100 Parts Monomer NaBH₄ | Nigrosine | Below LL Paper | Sand | Above LL Paper | Sand |
|---|---|---|---|---|---|---|---|---|---|---|
| 1 | No | .06 | C₄ | E | — | — | 1.0 | 2.0 | 1.0 | 2.5 |
| 2 | No | .06 | C₄ | L | — | — | 1.0 | 1.5 | 1.0 | 1.5 |
| 3 | Yes | .06 | C₄ | E | — | — | 0.2 | 1.0 | 0.2 | 2.5 |
| 4 | Yes | .06 | C₄ | L | — | — | 0.8 | 0.8 | 0.8 | 0.8 |
| 5 | Yes | .06 | C₄ | E | .004 | — | 0.2 | 1.0 | 0.2 | 2.5 |
| 6 | Yes | .06 | C₄ | E | — | .0005 | 0.2 | 1.5 | 0.2 | 2.5 |
| 7 | Yes | .06 | C₄ | E | .004 | .0005 | 0.5 | 1.0 | 0.5 | 2.5 |
| 8 | Yes | .06 | C₄ | L | .004 | — | 0.3 | 0 | 0.3 | 0.1 |
| 9 | Yes | .06 | C₄ | L | — | .0005 | 0.5 | 0.5 | 0.5 | 0.5 |
| 10 | Yes | .06 | C₄ | L | .004 | .0005 | 0 | 0.1 | 0.3 | 0.3 |
| 11 | Yes | .06 | C₁₀ | E | — | — | 0.5 | 0 | 0.5 | 2.2 |
| 12 | Yes | .06 | C₁₀ | E | .004 | — | 0.3 | 0 | 0.3 | 2.5 |
| 13 | Yes | .06 | C₁₀ | E | — | .0005 | 0.3 | 0 | 0.3 | 2.5 |
| 14 | Yes | .06 | C₁₀ | E | .004 | .0005 | 0 | 0 | 0 | 2.0 |
| 15 | Yes | .06 | C₁₀ | L | .004 | .0005 | 0 | 0 | 0 | 0 |
| 16 | No | .06 | C₈ | E | .004 NaNO₂ | .0005 | 0 | 0 | 0 | 2.0 |
| 17 | Yes | .06 | C₁₀ | E | .004 | .0005 | 0 | 0.5 | 0 | 1.7 |
| 18 | Yes | .06 | C₄ | L | .004 | — | 0.5 | 1.0 | 0.5 | 1.0 |
| 19 | Yes | .06 | C₈ | L | .004 | .0005 | 0 | 0 | 0 | 0.1 |

MOC = Hydroxypropyl methyl cellulose.
C₄ is di-sec-butyl peroxydicarbonate.
C₈ is di(2-ethyl hexyl)peroxydicarbonate.
C₁₀ is di(4-t-butyl cyclohexyl)peroxydicarbonate.
HF = Hydrofull.
E = early catalyst addition.
L = late catalyst addition.
LL = liquid level.

Referring to the above Table II it can readily be ascertained that the combination of a long chain (C₁₀) alkyl peroxydicarbonate catalyst in combination with nigrosine and sodium borohydride, and late catalyst addition (Example 15) is most effective in eliminating buildup on the inner reactor surfaces. The Examples in the Table clearly show that late catalyst addition reduces sandy buildup especially above the liquid level in the polymerization reactor. Further, the data shows the hydrofull operation is much more effective in reducing paper and sandy buildup as compared to non-hydrofull operation. Most important, however, the Examples clearly show that the combination of a water-soluble inhibitor and an oil-soluble inhibitor is far superior in eliminating polymer buildup than the use of either alone. Further, 30 or more charges have been run in a reactor without cleaning between charges when using the combination of inhibitors. When, after a prolonged period of operation, it becomes necessary to open and clean the reactor, spatula cleaning or scraping of the buildup present is not necessary since what buildup is present can be washed off with a pressure ream of water when using the process of the present invention. Further, particle size and porosity of the polymers and copolymers are not adversely affected by use of the invention.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A process for preparing vinyl chloride polymer products with substantially no polymer buildup in the reactor which comprises contacting in an aqueous medium in a reactor a mixture comprising (a) vinyl chloride monomer or a mixture thereof with up to about 80% by weight of one or more vinylidene monomers having at least one terminal $CH_2{=}C{<}$ grouping; (b) a dispersant for the monomer(s); (c) from about 0.0005 weight part to about 0.02 weight part, based on 100 weight parts of monomer(s) of a water-soluble inhibitor in an aqueous caustic solution, said inhibitor being selected from borohydrides having the formula

wherein X is an alkali metal and wherein each of R, R' and R" may be hydrogen, phenyl, an alkyl group containing from 1 to 10 carbon atoms, or an alkoxy radical containing from 1 to 10 carbon atoms; and alkali metal nitrites, alkaline earth nitrites, or ammonium nitrite; (d) an oil-soluble, spirit-soluble nigrosine; (e) from about 0.001% by weight to about 1.0% by weight based on the weight of the monomer(s) of an oil-soluble, substantially water-insoluble free radical producing catalyst selected from dialkylperoxydicarbonates wherein the alkyl groups are straight chained or branched and contain from 4 to 14 carbon atoms, adjusting and maintaining the pH of said mixture greater than 7.0, and reacting said mixture at a temperature in the range of about 0° C. to about 100° C. and maintaining the pressure in the range of about 1 to 15 atmospheres throughout the reaction.

2. The process of claim 1 wherein the reactor is maintained completely full during the entire reaction by the addition of aqueous medium thereto.

3. The process of claim 1 wherein vinyl chloride monomer is polymerized.

4. The process of claim 1 wherein the dispersant is methyl hydroxypropyl cellulose.

5. The process of claim 1 wherein the water-soluble inhibitor is sodium borohydride.

6. The process of claim 1 wherein the catalyst is added last to said mixture and after the same is brought to the reaction temperature.

7. The process of claim 1 wherein the catalyst is di-sec-butyl peroxydicarbonate.

8. The process of claim 1 wherein the catalyst is di(2-ethylhexyl) peroxydicarbonate.

9. The process of claim 1 wherein the catalyst is di(4-t-butyl cyclohexyl) peroxydicarbonate.

10. The process of claim 2 wherein vinyl chloride monomer is polymerized.

11. The process of claim 10 wherein the catalyst is di(4-t-butyl cyclohexyl) peroxydicarbonate.

12. The process of claim 11 wherein the dispersant is methyl hydroxypropyl cellulose.

13. The process of claim 12 wherein the water-soluble inhibitor is sodium borohydride.

14. The process of claim 13 wherein the oil-soluble inhibitor is nigrosine.

15. The process of claim 14 wherein the pH of the mixture is maintained in the range of 8.0 to 10.0 throughout the reaction.

16. The process of claim 1 wherein the pH of the mixture is maintained in the range of 8.0 to 10.0 throughout the reaction.

* * * * *